Patented Oct. 21, 1930

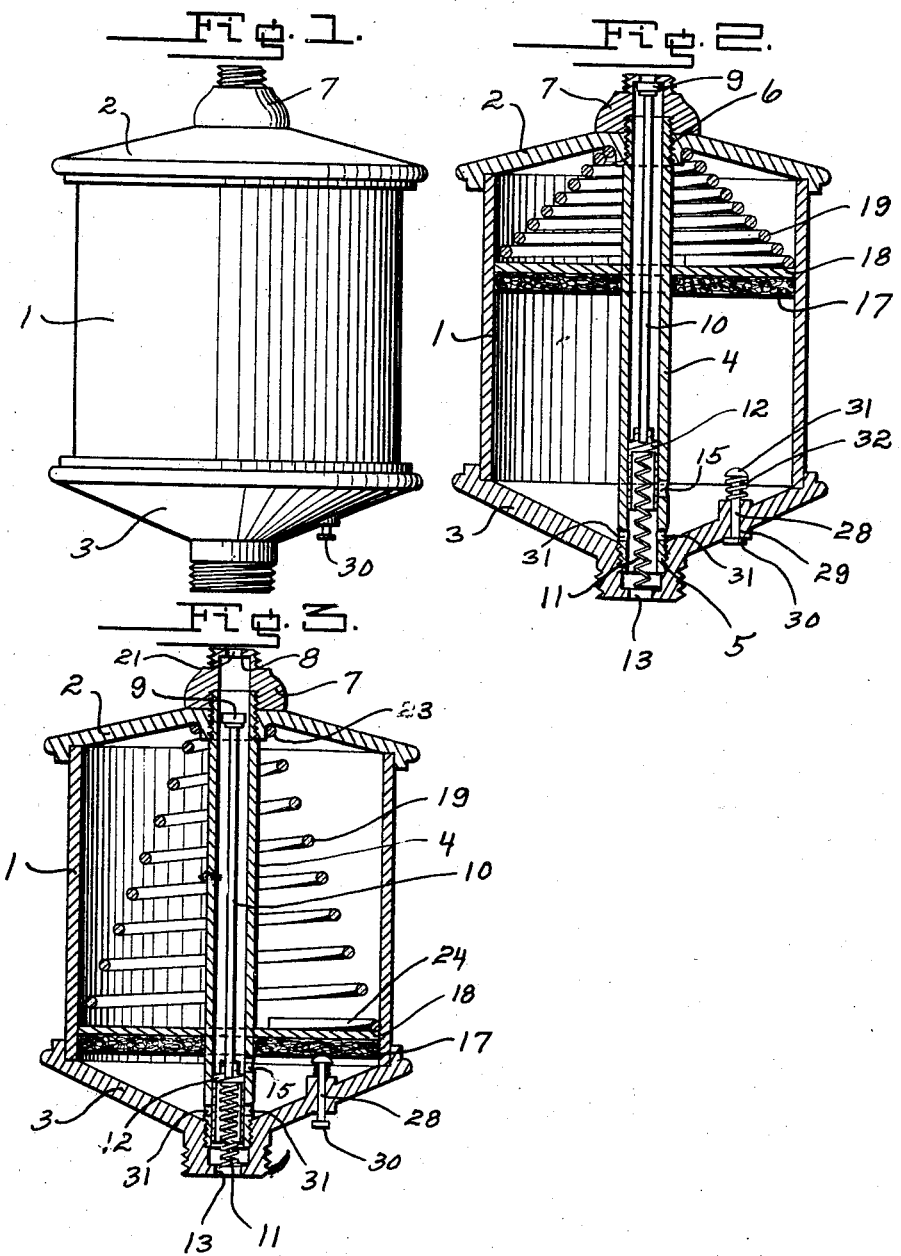

1,779,351

UNITED STATES PATENT OFFICE

WESLEY ARMSTRONG, OF REGINA, SASKATCHEWAN, CANADA

GREASE CUP

Application filed November 8, 1927. Serial No. 231,923.

This invention relates to improvements in grease cups and has for its object to provide an inlet and outlet controlled by a common piston rod.

Another object of the invention is to provide in a grease cup a spring controlled outlet and a grease gun controlled closure for said outlet.

A still further object of the invention is to provide in a grease cup a combined inlet port and outlet port and means whereby this port may be controlled by a grease gun operating a piston plunger.

A still further object of this invention is to provide within a grease cup adapted to be loaded with a grease gun a means whereby the grease within said cup may be fed to the moving part under continuous pressure applied by a spring.

With the above and such other objects in view as may hereinafter more fully appear, I have invented the device illustrated in the accompanying drawing in which:

Figure 1 is an elevational view of my grease cup showing an indicator;

Figure 2 is a longitudinal sectional view of the cup, filled;

Figure 3 is a similar view shown empty in filling position.

Like reference characters indicate like parts thoughout the following specification and in the several views in the drawings, in which 1 indicates a grease cup having a fixed top 2 and a funnel shaped bottom 3, which has a threaded end by means of which the cup may be screwed into a bearing, a filler tube 4 extends centrally and entirely through said cup and has a threaded end 5 which screws into the funnel shaped bottom 3. The upper end of said tube 4 is provided with a thread 6 to which a fixture 7 for attaching a grease gun may be screwed. The pressure of the grease bearing upon the valve 9 and piston cup 12 pushes down the piston cup 12 forcing it to a position below the port 15 and closing ports 31 thus allowing the grease to be forced down said tube 4 through its port 15 and into the cup cylinder 1, shoving up the felt washer 17, and disc plate 18, (both of which ride upon the tube 4) against the tension of conical coil spring 19, until the cup is filled. Upon removal of the grease gun nozzle from the fixture 7 the spring 11 will force the piston cup 12 which is fixed to the stem 10 upwardly, and seat the valve disc 9 upon the flange seat 8, and thus close the inlet port 21 formed by said flange, with the cup 12 closing the port 15 and opening ports 31. Coiled around the tube 4 within the cylinder 1 is the conical spring 19, its small end 23 bearing against the top 2, and its large end 24 seating on the disc 18 whereby the tendency of the said spring is to push the disc 18 down and urge the grease in the cup 1 in through the ports 31 when piston 12 is above port 31 and then down through the lower end of the tube 4 and outlet port 13 upon the bearing intended to be lubricated.

Means are provided for indicating the stage of the contents of the casing 1 and comprises a cylindrical rod 28 movable through an oil tight guideway indicated at 29 and with a push knob 30 on the outer end externally of the casing. The rod 28 is held by a spring 32, and is pushed inward into the position shown in Figure 2 with its inner end 31 directed into the path of the felt diaphragm 17, and will thus remain so long as the casing is filled with the lubricant.

When, however, the lubricant is nearly exhausted, the descending follower 17 will engage the rod and project the knob 30 and thus indicate to the attendant that the devices should be recharged with the lubricant.

Having now described my invention, that which I claim as new, and desire to protect by Letters Patent, is:

1. In a grease cup including a casing, a filler tube extending entirely thru the casing and having an inlet and an outlet port at opposite ends thereof opening interiorly of the casing, and valves controlling the ports and controlled by grease force under pressure thru the inlet port.

2. In a grease cup including a casing for retaining grease, a tube extending entirely thru the casing and having an inlet and an outlet portion at opposite ends thereof controlled by the pressure of grease applied thru the inlet port by a grease gun, a stem reciprocal in the tube, a disc valve carried by one end of the stem for closing said inlet port, a piston carried by the opposite end of the stem to control said outlet port, and means for normally urging the disc valve to a closed position over the inlet port.

3. In a device of the class described, a casing for retaining grease, a tube passing therethru and having ports opening into the casing, a rod operating in the tube, a valve on the upper end of the rod, a valve on the lower end of the rod for opening and closing said ports, and a seat provided at the upper end of the tube for the valve provided on the upper end of the rod.

4. In a device of the class described, a casing for retaining grease, a tube passing therethru, a rod operating in the tube, a valve on the upper end of the rod for closing the upper end of the tube, a second valve on the lower end of the rod, said lower valve consisting of a piston for controlling ports in the side wall of said tube, and means for normally urging the rod upwardly.

5. In a device of the class described, a casing for retaining grease, a tube passing therethru and having laterally opening ports spaced longitudinally of the tube adjacent its lower end, a rod operating in the tube, a valve on the upper end of the rod for closing an inlet port at the upper end of the tube, a valve on the lower end of the rod, said lower valve consisting of an inverted cup shaped piston acting to control the ports in the lower end of the tube, and a spiral spring projecting into and acting upon the cup shaped piston for normally urging the rod upwardly with the upper valve in seating position.

6. In a device of the class described, a grease cup comprising a casing including top and bottom walls, a tube extending thru the casing and opening thru the top and bottom walls, and having ports provided adjacent its lower end opening into the casing, a rod reciprocal in the tube and carrying valve means at each end controlled by the pressure of grease forced thru the upper end of the tube, a plunger slidable on the tube, spring means for normally urging the plunger downwardly for expelling the grease thru the lower end of the tube, and indicator means including a rod slidable thru the bottom wall of the casing and normally urged upwardly into the path of movement of the descending plunger.

WESLEY ARMSTRONG.